United States Patent [19]

Tanaka et al.

[11] Patent Number: 4,813,760

[45] Date of Patent: Mar. 21, 1989

[54] OPTICAL CONNECTOR AND PLUGS THEREFOR

[75] Inventors: Toshiyasu Tanaka; Sadakazu Ariga, both of Yokohama; Mituyosi Suzuki, Machida, all of Japan

[73] Assignee: E. I. Du Pont de Nemours and Company, Wilmington, Del.

[21] Appl. No.: 122,646

[22] Filed: Nov. 9, 1987

Related U.S. Application Data

[63] Continuation of Ser. No. 705,910, Feb. 26, 1985, abandoned.

[51] Int. Cl.$^4$ .............................................. G02B 6/38
[52] U.S. Cl. .................................. 350/96.21; 350/96.2
[58] Field of Search ................ 350/96.20, 96.21, 96.22

[56] References Cited

U.S. PATENT DOCUMENTS

| | | | |
|---|---|---|---|
| 3,947,182 | 3/1976 | McCartney | 350/96.22 |
| 4,133,601 | 1/1979 | Le Guen et al. | 350/96.21 |
| 4,198,119 | 4/1980 | Uberbacher | 350/96.21 |
| 4,209,227 | 6/1980 | Dubos et al. | 350/96.22 |
| 4,215,913 | 8/1980 | Turley et al. | 350/96.21 |

Primary Examiner—John D. Lee
Assistant Examiner—Robert E. Wise

[57] ABSTRACT

An optical connector plug having fitted therein an optical fiber cable comprised of at least one optical fiber and at least an outside jacket covering the optical fiber.

The optical connector is formed by accommodating the plugs respectively in housings each including a through hole adapted to receive the second holding portion of the ferrule and means for anchoring the plug at its base portion and connecting them to each other by an adapter having a through hole for receiving the first holding portion of each of the plugs.

19 Claims, 5 Drawing Sheets

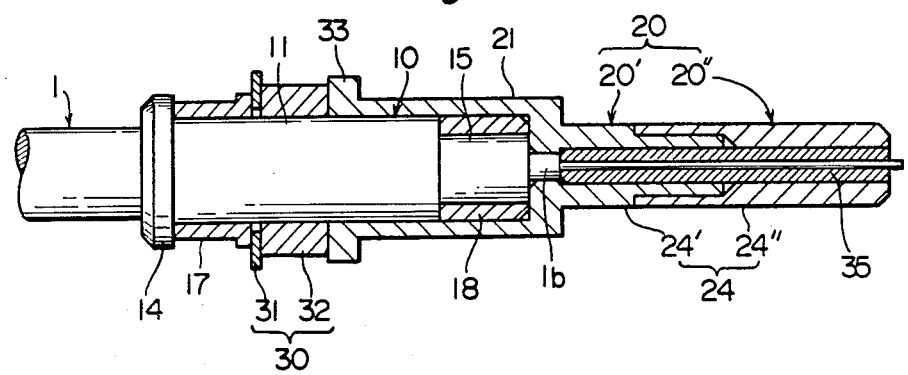
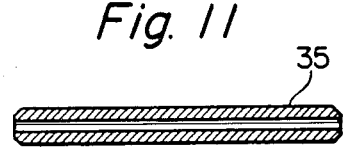
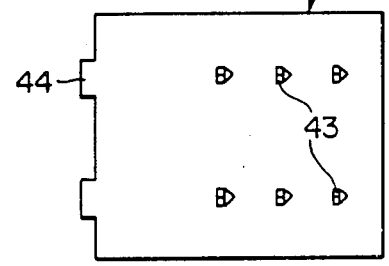
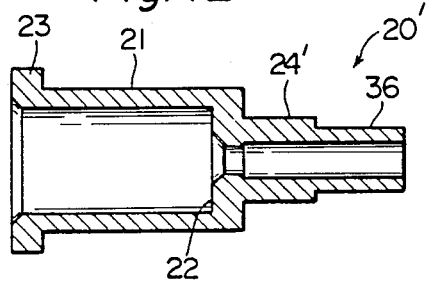
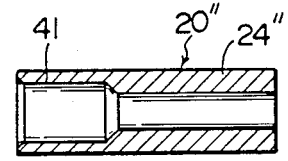
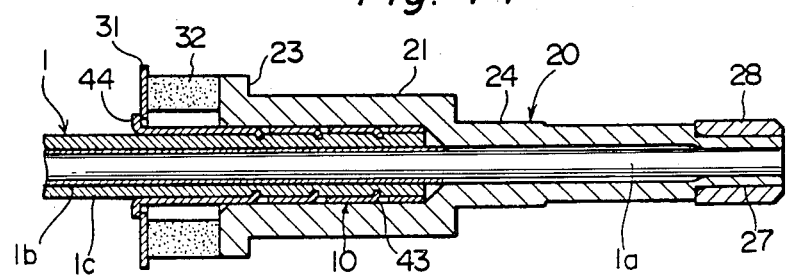

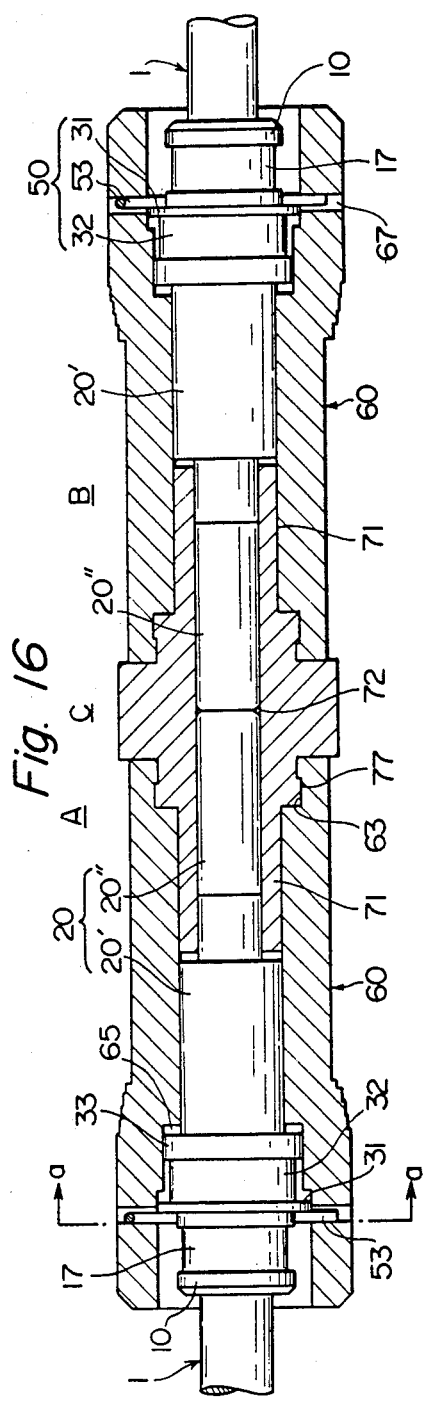
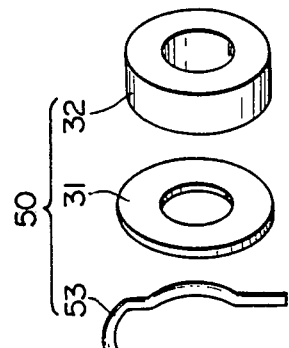
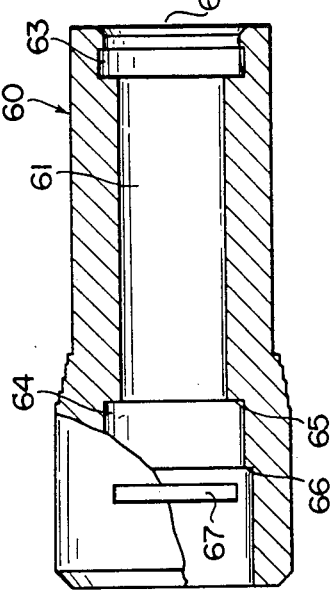
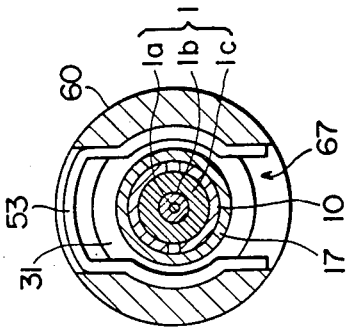

OPTICAL CONNECTOR AND PLUGS THEREFOR

This application is a continuation of application Ser. No. 705,910, filed Feb. 26, 1985, now abandoned.

BACKGROUND OF THE INVENTION

This invention relates to a plug for use in an optical connector. More specifically, this invention relates to an optical connector plug having fitted therein an optical fiber cable comprised of at least one optical fiber and at least an outside jacket covering the optical fiber.

Optical connector plugs are used either as such or as accommodated in housings, and form an optical connector by being secured to a socket or adapter.

A conventional optical connector plug has such a structure that a nozzle is formed at the central part of the bottom of a cylindrical ferrule by boring with a high accuracy, and that part of an optical fiber cable from which the jackets have been removed is inserted into the nozzle and fixed by an adhesive filled in the ferrule.

Since such a conventional optical connector plug is produced by inserting the optical fiber into the nozzle as stated above, the end or the clad of the optical fiber is liable to be damaged, and the production yields are low. Another defect is that the use of the adhesive complicates the manufacturing process and a long period of time is required for assembling.

SUMMARY OF THE INVENTION

It is an object of this invention to provide an optical connector plug of a new structure.

Another object of this invention is to provide an optical connector plug which in spite of its simple structure, secures an optical fiber accurately in place and also has high mechanical strength.

Still another object of this invention is to provide an optical connector plug which can be produced very easily within short periods of time and in very high yields.

Yet another object of this invention is to provide an optical connector having the structure of the optical connector plug of this invention.

Further objects and advantages of this invention will become apparent from the following description.

These objects and advantages of this invention are accomplished in accordance with this invention by an optical connector plug having fitted therein an optical fiber cable comprised of at least one optical fiber and at least an outside jacket covering the optical fiber, said plug comprising (A) a fixing sleeve for fixing the optical fiber cable at its jacket at least on the base end side of the plug, and (B) a ferrule including a first holding portion for guiding toward the forward end of the plug, that part of the optical fiber cable which projects from the fixing sleeve with at least its jacket being removed and holding it in place, and a second holding portion for covering and holding at least that part of the fixing sleeve which is on the side of the forward end of the plug in such a relation that the fixing sleeve is fixed to the second holding portion.

BRIEF DESCRIPTION OF THE ACCOMPANYING DRAWINGS

FIG. 10 is a partial sectional view of still another embodiment of the plug of this invention;

FIG. 11 is a sectional view of a guide sleeve for projecting a optical fiber;

FIGS. 12 and 13 are sectional views of the components of a ferrule which when combined, form the ferrule of the plug of this invention;

FIG. 14 is a partial sectional view of yet another embodiment of the plug of this invention;

FIG. 15 is an exploded view of another embodiment of the fixing sleeve;

FIG. 16 is a partial sectional view of one embodiment of the optical connector of this invention;

FIG. 17 is a side elevation of the optical connector shown in FIG. 6;

FIG. 18 is a partial sectional view of one embodiment of the housing of the optical connector;

FIG. 19 is a sketch of an anchoring member for the optical connector

DETAILED DESCRIPTION OF THE INVENTION

Figure 1:
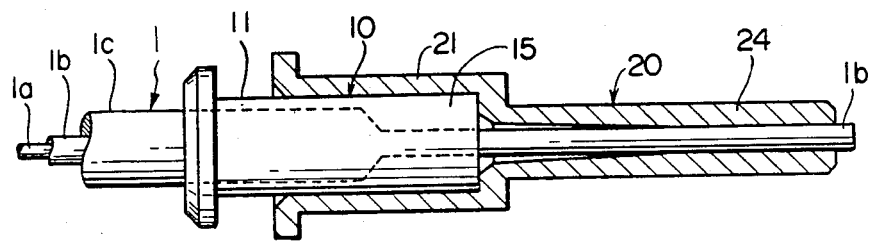
FIG. 1 is a partial sectional view of one embodiment of the optical connector plug of the invention.

The optical fiber cable fitted in the optical connector plug of this invention at least has an optical fiber and a jacket covering the optical fiber. The cable may comprise one or a plurality of optical fibers. Generally, commercial optical fiber cables at least have a jacket which is made, for example, of a synthetic resin and protects the optical fiber.

Examples of such optical fiber cable include a cable comprising a quartz or multi-component glass fiber having a diameter of 125 to 250 micrometers, an inside jacket having an outside diameter of about 1 mm thereon and further an outside jacket having an outside diameter of about 3 mm, a cable comprising a plastic fiber having a diameter of 0.7 mm or 1 mm and a jacket having an outside diameter of about 3 mm, and a cable comprising a glass fiber bundle having a diameter of about 1 mm and a jacket having an outside diameter of about 3 mm.

One outstanding feature of the optical connector plug of this invention is that the optical fiber of such an optical fiber cable as mentioned above is fixed at its jacket to the fixing sleeve at different positions of the optical fiber in its axial direction, and is guided toward the forward end of the plug, and held, by the ferrule. Since the optical fiber for forming an optical connector is fixed, guided and held by two different members, i.e. the fixing sleeve and the ferrule, a mechanically firm optical connector can be surely formed.

In the optical connector plug of this invention, the fixing sleeve fixes the optical fiber at its jacket at least on the base end side of the plug. For example, the fixing sleeve can fix the optical fiber at its jacket in substantially all of its par ranging from the base end to the forward end of the plug. Such a fixing sleeve has anchoring protrusions, for example, and fixing the jacket of the optical fiber is effected by the biting of the anchoring protrusions into the jacket.

The fixing sleeve in its another embodiment has a first fixing portion for fixing the jacket of the optical fiber at the base end side of the plug and a second fixing portion for fixing the optical fiber on the forward end side of the plug at least at that part of the fiber from which the jacket has been removed. Since such a fixing sleeve singly can fix a optical fiber cable having an inside and an outside jacket both at the outside and inside jackets, the fixed part of the inside jacket and the fixed part of the outside jacket are prevented from being displaced in the direction of the axis of the optical fiber. Accordingly, with the plug of this invention including the aforesaid fixing sleeve, loosening of the fixing of the optical fiber at least does not easily occur in the event of such displacement. The fixed sleeve includes a first fixing portion for fixing the optical fiber at its jacket and a second fixing portion for fixing at least that part of the optical fiber from which the jacket has been removed. The cross sectional area of a passage for insertion of the optical fiber, taken at right angle to the passage, is generally smaller in the second fixing portion than in the first fixing portion. The cross-sectional surface of the passage has such a shape as to easily permit insertion of the optical fiber cable, for example a circular shape. The inside diameter of the cross section of the passage in the second fixing portion corresponds nearly to the outside diameter of the optical fiber having an inside jacket or having no jacket to be fixed to the second fixing portion, and the inside diameter of the cross section of the passage in the first fixing portion corresponds nearly to the outside diameter of the optical fiber cable to be fixed to the first fixing portion. Means for rendering the fixation firm, such as threads and protrusions may be provided on the inner wall of the passage. The threads, protrusions, etc. bite into the jacket to make the fixation firm. Desirably, the heights of the threads and protrusions are smaller than the thickness of the jacket to avoid a damage of the optical fiber.

The first and second fixing portions of the fixing sleeve may have the same or different outside shapes and sizes. For example, the outside shapes of the first and second fixing portions of the fixing sleeve are circular in a direction at right angles to the inserting direction of the optical fiber cable, and the first fixing portion has a larger outside diameter than the second fixing portion.

Another feature of the optical connector plug of this invention consists in comprising a ferrule which guides the optical fiber toward the forward end of the plug at that part which projects from the fixing sleeve and holds it in place, and is located in a fixed relation to the fixing sleeve. Since the ferrule is in a fixed relation to the fixing sleeve, it imparts a correct coupling direction to the plug at the time of forming an optical connector. The ferrule has a first holding portion and a second holding portion. The first holding portion guides that part of the optical fiber which projects from the fixing sleeve toward the forward end of the plug and holds it in place. That part of the optical fiber which projects from the fixing sleeve has at least its outside jacket removed. In this state, therefore, the optical fiber may have an inside jacket or a guide sleeve directly provided thereon, or may be bare without any covering. In the case of a cable having one glass fiber, it preferably has an inside jacket or a guide sleeve. The guide sleeve may be a fine tube of a metal such as copper and brass having a hollow passage, and can be provided on the optical fiber by first removing the outside jacket or the inside jacket from the optical fiber cable and then inserting the bare optical fiber into the hollow passage of the metallic tube.

The second holding portion of the ferrule covers, and holds, at least that part of the fixing sleeve which is on the forward end side of the plug in a fixed relation to the fixing sleeve. This condition can be created, for example, by forcibly putting the second holding portion of the ferrule in tight fit over the outside surface of the fixing sleeve from the forward end side of the plug.

The cross-sectional area of a passage taken in a direction at right angles to the axis of the optical fiber is generally smaller at the first holding portion for holding an optical fiber having an inside jacket or a guide sleeve for example than at the second holding portion. Preferably, the passage at the first holding portion is progressively enlarged from the forward end portion of the plug or from some intermediate point of the passage in the direction of the second holding portion so as to permit easy insertion of the optical fiber in assembling the plug. The shape of the passage at the first holding portion is, for example, nearly circular in a direction at right angles to the passage. The passage of the second holding portion preferably decreases slightly toward the forward end direction of the plug when the fixed relation between the second portion of the ferrule and the fixing sleeve is created, for example, by putting it over the outside surface of the fixing sleeve. When it is desired to create the fixed relation by threadably fitting the second holding portion of the ferrule over the fixing sleeve, the second holding portion has a thread to be fitted with the thread formed on the outside surface of the fixing sleeve.

The first and second holding portions of the ferrule have the same or different outside shapes and sizes. For example, the outside shapes of the first and second holding portions are circular in a direction at right angles to the inserting direction of the optical fiber, and the outside diameter of the second holding portion is larger than that of the first holding portion.

The first holding portion may be formed as an integral unit with the second holding portion or as a separate part from the latter. The first holding portion as a single separate part may be formed, for example, by providing a ferrule having a first holding portion of the desired length with its part corresponding to the forward portion of the plug formed in a smaller thickness than the rest, and putting a separately prepared collar over the thin part. It can also be formed by providing a ferrule having a first holding portion shorter than the desired length because of the lack of a part corresponding to the forward end portion of the plug, and connecting a part corresponding to the forward end portion of the plug to the first holding portion to provide the desired length.

The method of producing the optical connector plug of this invention will be described in detail hereinbelow with reference to the drawings. Briefly stated, the general production procedure comprises removing at least the outer jacket of the forward end portion of an optical fiber cable, inserting the optical fiber cable into the passage of the fixing sleeve from its base end or encircling and fixing it with the fixing sleeve, and thereafter inserting the forward end portion of the optical fiber cable having at least the outside jacket removed into the passage of the ferrule to cover at least that part of the fixing sleeve which is on the forward end side of the plug with the first holding portion of the ferrule so that the first holding portion is fixed to the fixing sleeve.

Now, the optical connector of this invention using the plug of this invention will be described.

According to this invention an optical connector plug having a housing for the optical connector is first provided by accommodating the optical connector plug described above in a housing including a passage adapted for receiving the second holding portion of the ferrule of the plug and means for anchoring the plug at the base end portion of the passage.

According to this invention, there is also provided an optical connector by optically connecting the optical connector plug having the above housing to an adapter including a passage adapted for receiving the first holding portion of the ferrule of the adapter.

The housing has a passage in the longitudinal direction. The passage can receive the second holding portion of the ferrule of the plugs, and has any desired cross section or shape. It should, however, receive the second holding portion of the ferrule, and its cross section desirably corresponds to the cross section of the second holding portion. For example, if the cross section of the second holding portion is circular, the passage of the housing preferably has a circular cross section. The length of the passage is usually shorter than the point which the forward end surface of the first holding portion of the ferrule reaches when the second holding portion of the ferrule is accommodated in the passage. In other words, in the assembled state, the forward end portion of the ferrule usually projects from the forward end of the housing.

The cross section of the first holding portion of the ferrule is usually smaller than the cross section of the second holding portion. Hence, when the passage of the housing has a cross section of a fixed shape and size, a space occurs between the outside surface of the second holding portion and the inside surface of the passage of the housing upon receiving of the plug in the passage. As will be described below, this space serves to receive an adapter in the formation of an optical connector by coupling plugs accommodated in housings to each other.

The housing further has means for anchoring the optical connector plug at its base end portion. This means may be a slit-like opening provided in a direction at right angles to the longitudinal direction in the base end portion of the housing in which the base end portion of the ferrule of the plug is positioned. By inserting a stop spring or snap pin into the slit-like opening, the optical connector plug can be fixed to the housing.

The adapter has a passage capable of receiving the first holding portion of the ferrule of the plug. The first holding portion of the ferrule accommodated in the housing is inserted into the passage from each of the front and rear ends of the passage. At this time, the adapter comes in tight fit into the space formed between the inside surface of the passage of the housing and the outside surface of the first holding portion of the ferrule. As a result, the optical connector of this invention is formed by the optical connector plugs, the housings and the adapter.

Now, with reference to FIG. 1 which is a partial sectional view of one embodiment of the optical connector plug of this invention, an optical fiber cable 1 is comprised of an optical fiber (core) $1a$, an inside jacket $1b$ directly covering the optical fiber $1a$ and an outside jacket covering the inside jacket $1b$. A fixing sleeve 10 is provided which has a first fixing portion 11 and a second fixing portion 15.

In the plug of FIG. 1, the optical fiber $1a$ is fixed by the fixing sleeve 10 at the inner jacket at the second fixing portion 15 and at the outside jacket $1c$ at the first fixing portion 11. The first fixing portion 11 has an inside diameter corresponding to the outside diameter of the outside jacket $1c$ of the optical fiber cable 1 to be fixed.

The second fixing portion 15 of the fixing sleeve 10 has an inside diameter slightly larger than the outside diameter of the inside jacket $1b$ of the optical fiber cable to be fixed. The inside diameter of the second fixing portion 15 is smaller than the inside diameter of the first fixing portion 11.

In the plug of FIG. 1, the outside diameter of the second fixing portion 15 of the fixing sleeve 10 is substantially equal to the outside diameter of the first fixing portion 11.

That part of the optical fiber $1a$ which projects from the fixing sleeve 10 (the part designated by reference symbol $1b$ which is located comparatively on the right side in (FIG. 1) is guided toward the forward end of the plug by a first holding portion 24 of a ferrule 20 and held at its inside jacket $1b$. In addition to the first holding portion, the ferrule 20 has a second holding portion 21 which covers, and is fixed to, at least that part of the fixing sleeve which is on the forward end side of the plug.

Figure 2:
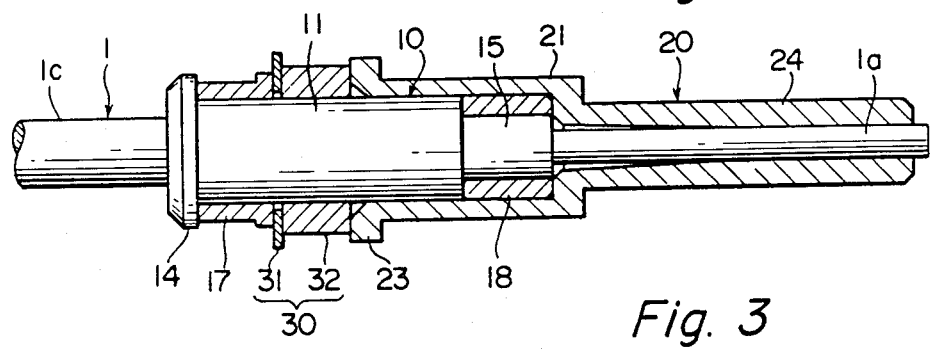
FIG. 2 is a partial sectional view of another embodiment of the optical connector plug of the invention.
Figure 3:
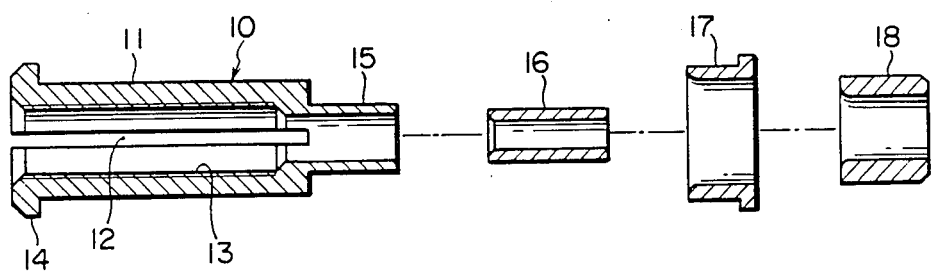
FIG. 3 is a sectional view of a fixing sleeve and various collars in the optical connector plug of the invention.
Figure 4:
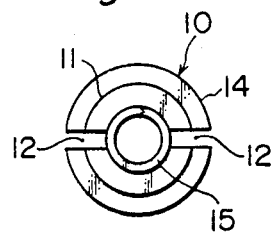
FIG. 4 is a side elevation of the plug shown in FIG. 2.

FIG. 2 is a partial sectional view of another embodiment of the optical connector plug of this invention. FIGS. 3 and 4 are a sectional view and a side elevation of one embodiment of the fixing sleeve 10.

In the optical connector plug shown in FIG. 2, the first fixing portion 11 of the fixing sleeve is formed in an inside diameter corresponding to the outside diameter of the outside jacket $1c$ of the optical fiber cable 1 to be fixed and has a thread 13 formed on its inside wall. The thread 13 bites the outside jacket $1c$ when the fixing sleeve 10 has come into tight fit with the optical fiber cable 1, and prevents sliding of the optical fiber cable from the fixing sleeve 10. Protrusions may be formed instead of the thread, and when sliding is not a problem, such slide preventing means is unnecessary. The fixing sleeve 10 illustrated in FIGS. 3 and 4 has a split 12 in its circumferential wall. The presence of the split 12 makes it easy to insert the optical fiber cable 1 and also to press the optical fiber cable against the sleeve 10 in tight fit. The outside diameter of the second fixing portion 15 of the fixing sleeve 10 is smaller than the outside diameter of the first fixing portion 11.

Figure 5:
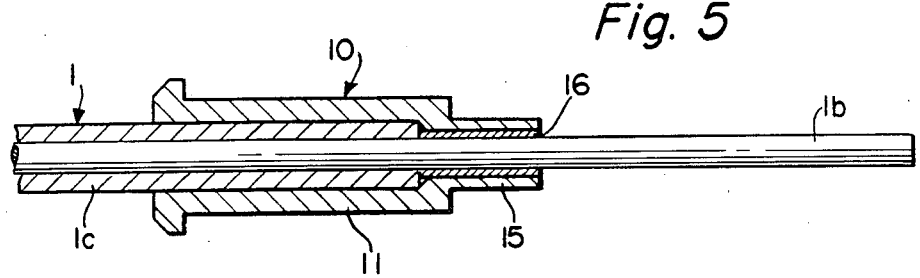
FIG. 5 is a sectional view showing the state in which an optical fiber cable is fixed at its inner jacket to a fixing sleeve by means of an auxiliary sleeve.

The optical connector plugs illustrated in FIGS. 2, 3 and 4 include optical fiber cables having no inside jacket 1b, and an auxiliary sleeve 16, a first collar 18 and a second collar 17. The auxiliary sleeve 16 is made of an elastic material such as a synthetic resin. As shown in FIG. 5, the auxiliary sleeve 16 is interposed between the outside surface of the optical fiber 1a and the inner wall of the first fixing portion 15 of the fixing sleeve 10 which opposes the outside surface of the optical fiber 1a. The presence of the auxiliary sleeve 16 relaxes strain and protects the optical fiber 1a when the second fixing portion of the fixing sleeve 10 is brought into tight fit with the optical fiber cable 1. The collar 17 is formed of a metal such as stainless steel. The collar 17 is received in tight fit over the second fixing portion 15 to clamp it and press the jacket 1c of the inserted optical fiber cable tightly against the sleeve 10. The collar 17 may have a circular section in a direction at right angles to the longitudinal direction of the optical fiber cable inserted, as shown in FIG. 3, or it may have a C-shaped cross section. A strip of metal plate to be applied by press fitting may also be used as the collar 17. Mounting of the collar 17 is not limited to press fitting or forced fitting, and it may also be fitted after heat expansion. Alternatively, the collar 17 may be formed of a shape memorizing alloy and mounted by utilizing its shape memorizing effect.

The collar 18 is formed of a metal such as stainless steel. It is received in tight fit over the second fixing portion 15 to press and deform the second fixing portion 15 and press the optical fiber 1 inserted therein. The collar 18 is formed in a cylindrical form having a slightly smaller inside diameter than the outside diameter of the second fixing portion 15. The shape of the collar 18 may be the same as that of the collar 17, and its mounting can also be effected in the same way as in the case of the collar 17.

Figure 6:
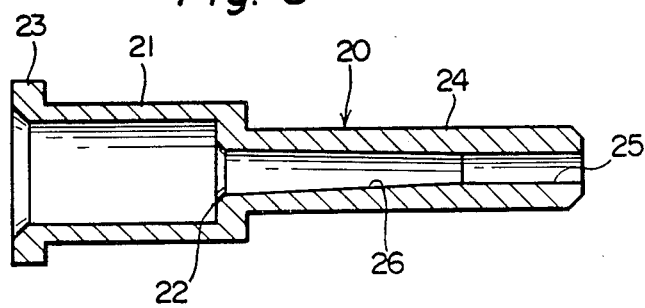
FIG. 6 is a sectional view of one embodiment of the ferrule in the plug of this invention.

The ferrule 20 is formed of a metal such as brass, and as shown in FIG. 6, constructed so as to have a second holding portion 21 for securing the sleeve 10 at its base end portion and a first holding portion 24 for holding the optical fiber 1a in the direction of the optical axis at its forward end portion. The second holding portion 21 is formed in an inside diameter nearly equal to the outside diameter of the fixing sleeve 10, and secures the forward end portion of the fixing sleeve 10 in tight fit. This securing in tight fit can also effect the press fitting of the outside jacket 1c of the optical fiber cable to the fixing sleeve 10. The second holding portion 21 functions as a holding portion for the entire plug when the plug is used as accommodated on a housing. In this case, its outside shape and diameter are desirably set so as to correspond to those of the housing. The first holding portion 24 projects from the forward end portion of the second holding portion 21 as a unit with the latter, and the boundary between them forms a stepped portion 22. A flange 23 is provided at the base end portion of the second holding portion 21. The flange 23 functions as an anchoring portion when the plug is received in the housing. In the ferrule shown in FIG. 6, the first holding portion 24 has provided at its forward end a nozzle portion 25 having the same inside diameter as the outside diameter of the optical fiber 1a inserted, and the nozzle portion 25 effects centering of the optical fiber 1a. A taper 26 is formed between the nozzle portion 25 and the stepped portion 22 to permit easy insertion of the optical fiber 1a. On the other hand, the outside diameter of the first holding portion 24 is set to correspond to the inside diameter of an insertion hole of a socket, adapter, etc. into which the plug is to be inserted. Hence, the outside diameter of the first holding portion 24 may sometimes be equal to the second holding portion 21.

Figure 7:
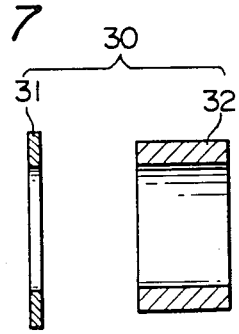
FIG. 7 is a sectional view of an anchoring member in its one embodiment.

An anchoring member 30 comprised of a washer 31 and an elastic body 32 as shown in FIG. 7 is used to anchor the plug to the housing when the plug is mounted on the housing, as will be described hereinafter. The elastic body 32 is composed, for example, of a silicone rubber in a ring form and absorbs the displacement of the plug within the housing. This enables the forward end of the plug to be contacted surely with another plug, etc.

The plug of this invention illustrated in FIGS. 2 to 7 can be produced, for example, in the following manner. First, the jacket at the forward end portion of the optical fiber cable 1 is removed over a length nearly corresponding to the length of the ferrule 20 to expose the optical fiber 1a, and the protective sleeve 16 is put over the optical fiber 1a. The forward end portion of the optical fiber cable 1 is inserted into the fixing sleeve 10. The collar 17 is put over the first fixing portion 11 from its forward end of the first fixing portion 11 until it makes contact with the flange, thereby clamping the first fixing portion 11 and the jacket and pressing it in tight fit against the jacket 1c. Thereafter, the collar 18 is put over the second fixing portion 15 in tight fit to press and deform the second fixing portion inwardly, thereby compressing the protective sleeve 16 and pressing the second fixing portion 15 tightly against the optical fiber 1a. As a result, the fixing sleeve 10 is fixed to the optical fiber cable 1.

Then, the washer 31 and the elastic body 32 are fitted over the fixed sleeve 10, and the ferrule 20 is mounted by attaching the second holding portion 21 to the fixing sleeve 10 while the optical fiber cable having the protruding optical fiber 1a is inserted into the first holding portion 24. The projecting portion of the optical fiber from the forward end of the ferrule 20 is removed by abrading In the plugs illustrated in FIGS. 1 to 7 which are produced as above, the jacket 1c and the optical fiber 1a of the optical fiber cable 1 are pressed in tight fit against the fixing sleeve 10. Hence, no longitudinal stress on the optical fiber cable will cause the jackets 1b and 1c and the optical fiber 1a to slip out or project from the sleeve, and the optical fiber cable remains firmly fixed in place. Furthermore, since the optical fiber 1a is inserted into the ferrule while it is tightly fitted in the fixing sleeve 10 of the ferrule 20, it can be easily inserted without undergoing damage. Furthermore, the optical fiber cable does not significantly deviate from the optical axis since the optical fiber 1a is guided and held by the ferrule 20 secured to a socket, an adapter, etc.

Figure 8:
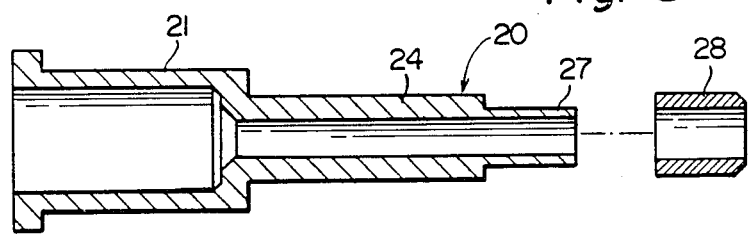
FIG. 8 is a sectional view of another embodiment of the ferrule.

When as shown in FIG. 8, a stepped portion 27 is provided at the forward end of the first holding portion 24 and collar 28 is pressed in tight fit against the outside surface of the stepped portion 27, the forward end of the optical fiber is held in tight fit with the forward end of the first holding portion 24, and therefore, the accuracy of centering further increases. A plug including the ferrule shown in FIG. 8 is produced by fitting the collar 28 after attaching the ferrule 20.

In the plugs shown in FIGS. 2 to 8, the fixing sleeve is pressed by using the collars 17 and 18, but if desired instead of using the collars 17 and 18, a pressing tool may be used to press the fixing sleeve 10. But the use of collars has the advantage that the accuracy of pressing is good, and no disorder owing to heat cycles, etc. occurs. It is also possible to make the fixing sleeve from a shape memorizing alloy, and press it by utilizing its shape memorizing effect, and in this case, too, no collar is required.

Figure 9:
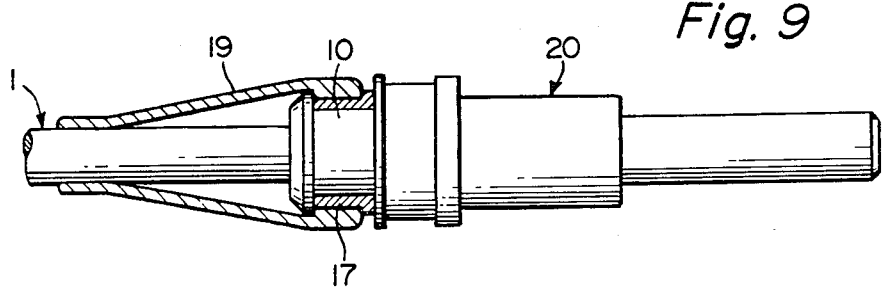
FIG. 9 is a partial sectional view showing the state in which a rubber boot is attached to the plug of this invention.

As shown in FIG. 9, a rubber boot 19 may be attached to the base end portion of the fixing sleeve 10. This can prevent damage of the optical fiber cable 1 at the time of mounting and detaching the plug.

FIG. 10 shows a partial sectional view of another embodiment of the optical connector plug of this invention. In FIG. 10, the same reference numerals as in FIGS. 1 to 9 have the same meanings. The plug shown in FIG. 10 differs from the plug shown in FIG. 2 in regard to the structure of the ferrule and the state of that part of the optical fiber which is held by the first holding portion of the ferrule.

That part of the optical fiber which is held by the first holding portion 24 of the ferrule 20 is covered by a guide sleeve 35 in the plug of FIG. 10.

As shown in FIG. 11, the guide sleeve 35 is composed of a fine tube of a metal such as brass, and formed in such an outside diameter as to permit insertion into members 20' and 20" of a holding sleeve 20 to be described. Its inside diameter is of a size which can receive the optical fiber 1a. The optical fiber 1a projecting from the forward end of the fixing sleeve 10 is inserted into the guide sleeve 35 to hold it axially and prevent its breakage.

The member 20' of the ferrule 20 is formed in a cylinder (a circular cylinder in this embodiment) of a metal such as brass having a large diameter at its base end portion and a small diameter at its forward end portion. As shown in FIG. 12, the member 20' is constructed by providing the second holding portion 21 for tightly holding the fixing sleeve 10 at its base end portion and the first holding portion 24' for axially holding the guide sleeve 35 at its forward end portion. A step portion 36 is further provided at the forward end portion of the first holding portion 24'.

The first holding portion 24' is formed in an inside diameter which permits insertion of the guide sleeve 35, and has provided at its forward end a stepped portion 36 adapted to receive the member 20" of the ferrule 20 in tight fit. The outside diameter of the first holding portion 24' is designed to as to correspond to the inside diameter of an insertion hole of a socket an adapter, etc. into which the plug is to be fitted. Hence, the outside diameter of the first holding portion 24' sometimes become equal to the diameter of the second holding portion 21.

As shown in FIG. 13, the member 20" of the ferrule 20 is formed of a metal such as stainless steel, and has a fitting portion 41 adapted to be received by the stepped portion 36 at its base end portion and a holding portion 24" for holding the guide sleeve 35 at its forward end portion. The member 20" comes into tight fit with the stepped portion 36 of the member 20' of the ferrule 20 and slightly presses the forward end portion of the guide sleeve 35. As a result, the guide sleeve comes into intimate contact with the optical fiber 1a held inside the guide sleeve.

FIG. 14 shows a sectional view of another embodiment of the optical connector plug of this invention. In the optical connector plug of FIG. 14, the fixing sleeve 10 fixes the optical fiber in position at its outside jacket substantially all the way from the base end side to the forward end side of the plug. The fixing sleeve 10, because it is received about the outside jacket 1c of the optical fiber cable 1, may be in the form of a flat plate formed from a metallic plate such as an iron plate by such means as punching, as shown, for example, in FIG. 15, and may be formed in a cylindrical shape after it has been put over the outside jacket 1c. Alternatively, it may be formed in a U-shape or a cylindrical shape before it is put over the outside jacket 1c. Anchoring protrusions 43 are provided on that surface of the fixing sleeve 10 which makes contact with the outside jacket 1c so as to prevent the optical fiber from slipping out of the sleeve. The anchoring protrusions 43 are provided by such means as cut raising or burring. Their shape in this embodiment is triangular for good biting into the outside jacket of the optical fiber. The shape, however, is not limited to it, and protrusions of any shape will do. To prevent damage of the optical fiber, the height of the protrusions is made smaller than the thickness of the jackets 1b and 1c. The anchoring protrusions 43 may be omitted when sufficient holding strength can be obtained by simply pressing the fixing sleeve 10 against the outside jacket 1c in tight fit.

Raised anchor portions 44 are formed at the base end portion of the fixed sleeve 10 for temporarily holding the elastic body 32 and the washer 31 in assembling an optical connector, as shown in 14. These raised portions may be omitted.

Some embodiments of the optical connector of this invention comprising the plug of this invention will be described.

FIG. 16 shows one embodiment of the optical connector of this invention, and FIG. 17 is a sectional view taken along line a—a of FIG. 16. The optical connector shown in these drawings is comprised of plugs A and B each secured to the end of an optical fiber cable 1 and an adapter C connecting them to each other. The plugs A and B are each accommodated in a housing 60. In the optical connector shown in FIGS. 16 and 17, the plugs A and B are of the same type as shown in FIG. 10.

The housing 60 for accommodating the plug is formed of a synthetic resin, a metal, etc. in a nearly cylindrical form with a central through-hole 61 formed longitudinally, as shown in FIG. 18. The plugs A and B are mounted on the housings 60 by anchoring members 50, for example, of the type shown in FIG. 19.

The through hole 61 is a part where the plugs are connected with the adapter C, and is formed in a cross-sectional shape and diameter corresponding to the aforesaid function. The connecting part and the holding part of the hole 61 have the same cross-sectional shape and diameter in FIGS. 16 and 18, but may have different cross-sectional shapes and diameters. An undercut 63 is formed in an opening 62 at the forward end of the through hole 61 so as to secure accurate connection with the adapter.

At the base end portion of the through hole 61 is provided an anchoring portion 64 for anchoring the plug. The anchoring portion 64 is comprised of a first stepped part 65, a second stepped portion 66 having a larger diameter than the first stepped portion, and a stop spring mounting hole 67 formed on the outside of the second stepped part 66 at right angles to the longitudinal direction. The anchoring member 50 is secured to the anchoring portion 64.

The anchoring member 50 is composed of an elastic body 32, a washer 31 and a stop spring 53, and serves to anchor the plug to the housing. The elastic body 32 is formed of an elastic material such as rubber in an annular or cylindrical shape and serves to absorb displacement of the plug within the housing 60. Accordingly, the elastic body 32 may be a coil spring or the like. The stop spring 53 is a spring formed in a nearly U-shaped configuration. It is inserted into the stop spring mounting hole 67 of the housing 60 to hold the be constructed by using a snap ring instead of the stop spring 53 and the washer 31.

Figure 20:
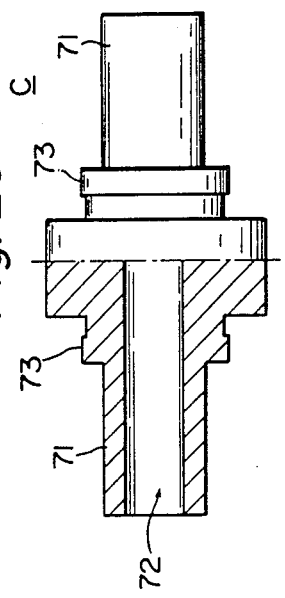
FIG. 20 is a partial sectional view of one embodiment of an adaptor for the optical connector.

The adapter C to be fitted into the housings is made of a metal, a plastic materials, etc., and as shown in FIG. 20, is formed in a nearly cylindrical shape as a whole. It is interposed between the plugs A and B and connect them to each other. The opposite ends of the adapter C have projecting fitting portion 71 each of which has at its base portion a raised anchor portion 73 adapted to fit into the undercut 63 of the housing 60. A guide hole 72 adapted for insertion of the ferrules 20 of the plugs thereinto is provided longitudinally in the adapter C.

The guide hole 72 is designed in such a cross-sectional shape and diameter as to permit insertion and withdrawal of the ferrules into and from it. Its length is determined such that when the adapter C is joined to the plugs A and B, the facing ends of the optical fibers 1a of the optical fiber cables 1 held by the plugs A and B abut against each other if the play of the inside diameter of the guide hole and the play of the outside diameter of the ferrule 20 are reduced to an extent which does not make the insertion of the ferrule 20 difficult, the deviation of the axes of the ferrules 20 and therefore the axes of the optical fibers 1a is reduced. A converging light transmitting body such as a Selfoc lens may be provided centrally within the guide hole 72, and the ends of the optical fibers may face each other with the light-transmitting body interposed between them.

The optical connector shown in FIG. 16 is assembled in the following manner. First, the plugs are accommodated in the housings as follows: Each of the plugs A and B is inserted into the through hole 61 from the base end side of the housing 60, and the flange 33 of the ferrule 20 is fitted into the first stepped part 65 of the anchoring portion 64 to hamper the movement of the plugs A and B in their forward end directions. At the same time, the stop spring 53 is inserted into the stop spring insertion hole 67 to hold the washer 31 in place to arrest the movement of the plugs in their base end directions through the elastomer 32. Thus, the plugs are accommodated in the housing 60 and held there in tight fit.

The plugs A and B are then connected to the adapter C by inserting the ferrules of the plugs into the guide hole 72, inserting the fitting portions 71 of the adapter C into the through holes 61 of the housings 60, and then fitting the raised anchor portions 73 into the undercuts 63. By this connection, the optical fibers 1a in the plugs A and B are concentrically supported by the ferrules 20 of the plugs within the guide hole 72 and are caused to face each other at their ends while reducing deviations of their axes to a minimum. Since at this time the elasticity of the elastic body 32 permits slight axial displacement of the plugs and imparts a pressing force, the forward end portions of the opposing optical fibers 1a can be caused to abut accurately against each other.

Figure 22:
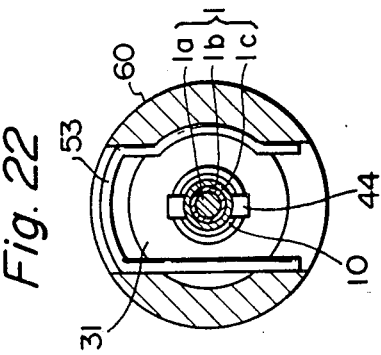
FIG. 22 is a side elevation of the optical connector shown in FIG. 21.
Figure 21:
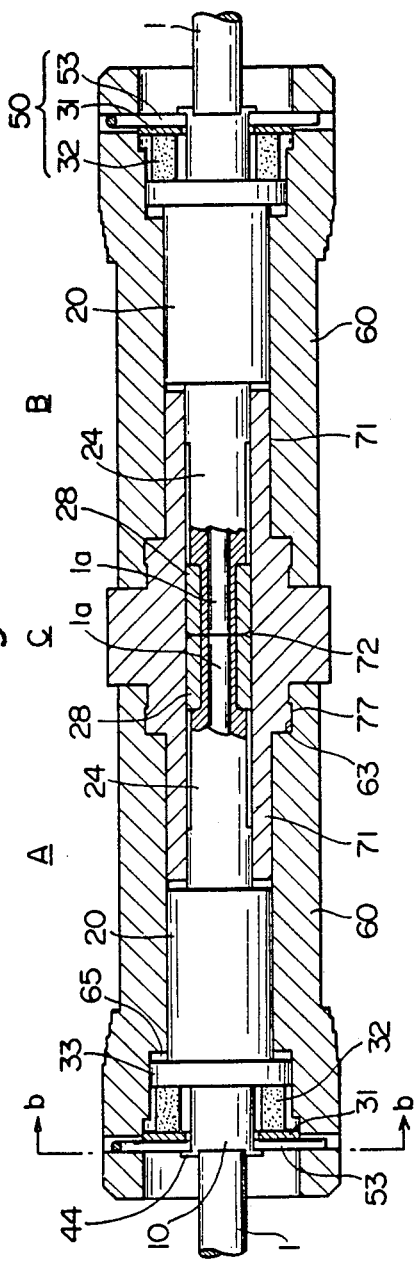
FIG. 21 is a partial sectional view of another embodiment of the optical connector of the invention.

FIG. 21 shows a sectional view of another embodiment of the optical connector of this invention, and FIG. 22 is a sectional view taken along line b—b of FIG. 22.

The optical connector shown in FIGS. 21 and 22 comprises plugs of the type shown in FIG. 14, and differs in this respect from the optical connector shown in FIGS. 16 and 17. Otherwise, it is the same as the optical connector of FIGS. 16 and 17.

FIGS. 16 to 22 show the case of using the plugs of this invention for connection of optical fiber cables to each other. But by building one of the plugs and the adapter C in a device, they can also be used to connect optical fibers to the device. For example, the adapter C can be built in the device by attaching a bracket to the adapter C and securing the bracket to a hole in the wall portion of the device. In this case, the plug inside the device may do without the housing and the fiber holding means may be directly fixed to the adapter. Instead of the optical fiber, a light emitting element and a light receiving element may be provided in the adapter inside the device.

FIGS. 16 to 22 show an optical connector comprising two plugs, but if desired, it is possible to provide a plurality of sets of plugs in a single housing and connect them by a plurality of sets of fitting portions provided in the adapter.

In the embodiments shown in FIGS. 16 to 22, the under cuts and the raised anchor portions are used to connect the plugs to the, adapter in tight fit. If desired, engaging claw-like members may be provided on the peripheral surfaces of the plugs and the adapters.

What is claimed is:

1. An optical connector plug having fitted therein an optical fiber cable comprised of at least one optical fiber and are least an outside jacket covering the optical fiber, said plug having a base end and a forward end and further comprising
    fixing sleeve means for fixing the optical fiber within the plug, said fixing sleeve means having a first fixing means for fixing the optical fiber at its jacket adjacent the base end of the plug and a second fixing means forward of said first fixing means for fixing the optical fiber without it jacket which projects from the fixing sleeve means, and
    ferrule means secured around said fixing sleeve means and extending beyond said fixing sleeve means toward the forward end of the plug, said ferrule means including a first holding means in contact with said optical fiber for guiding toward the forward end of the plug that part of the optical fiber which projects from the fixing sleeve means without jacket and holding it in place, and a second holding means for covering and holding said second fixing means and at least part of said first fixing means of the fixing sleeve means.

2. The plug of claim 1 wherein the fixing sleeve means fixes the optical fiber at its jacket substantially all the way from the base end to the forward end of the plug.

3. The plug of claim 2 wherein the fixing sleeve means has anchoring protrusions, and the optical fiber is fixed by the biting of the anchoring protrusions into the jacket.

4. The plug of claim 1 wherein the fixing sleeve means further has a first collar received in tight fit about the first fixing means.

5. The plug of claim 4, further comprising means for anchoring said plug within a housing, said anchoring means disposed around said first fixing means between said first collar and the first holding means of said ferrule means.

6. The plug according to claim 5, wherein the anchoring mean includes a washer and an elastic body, said elastic body absorbing displacement of said plug with the housing when said plug is connected to another plug.

7. The plug of claim 4 wherein the fixing sleeve means further has a second color received in tight fit about the second fixing means.

8. The plug of claim 7 wherein the ferrule means further has a third collar received in tight fit about the first holding means at the forward end portion of the plug.

9. The plug of claim 1 wherein an auxiliary sleeve is provided between the inside wall of the second fixing means which faces the outside surface of the optical fiber or an inside jacket of the fiber and the outside surface or inside jacket of the optical fiber.

10. The plug of claim 1 wherein the first holding means of the ferrule means guides the optical fiber toward the forward end of the plug and holds it in place in an axial bore which is tapered toward the forward end.

11. The plug of claim 1 wherein the first holding means of the ferrule means guides the optical fiber toward the forward end of the plug at a guide sleeve provided directly on the optical fiber and holds it in place.

12. The plug of claim 1, wherein the fixing sleeve means includes at least one split in its circumferential wall extending partially along its length from the base end.

13. The plug of claim 1, further comprising a flexible securing means attached to the base end of the plug and to the cable extending from said base end to prevent damage to the cable during mounting or detaching of the plug.

14. The plug of claim 1, wherein the first holding means of the ferrule means has an axial bore which receives that part of the optical fiber with its jacket removed projecting from the fixing sleeve means, said plug further comprising a guide sleeve surrounding the optical fiber received with said axial base of said first holding means.

15. The plug of claim 14, wherein said first holding means comprises two separate sections, one section adapted to be secured to the other section, said other section being integral with the remainder of the ferrule means.

16. An optical connector plug accommodated in a housing, said plug having a base end and a forward end and having fitted therein an optical fiber cable comprised of at least one optical fiber and at least an outside jacket covering the optical fiber and further comprising
fixing sleeve means for fixing the optical fiber cable at its jacket on the base end of the plug, said optical fiber without its jacket extending from said fixing sleeve means toward the forward end of the plug,
ferrule means secured around said fixing sleeve means and extending beyond said fixing sleeve means to the forward end of said plug, said ferrule means including a first holding means in contact with said optical fiber for guiding toward the forward end of the plug that part of the optical fiber cable which projects from the fixing sleeve means without its jacket and holding it in place, and a second holding means for covering and holding at least that part of the fixing sleeve means facing the forward end of the plug in such a relation that the fixing sleeve means is fixed to the second holding means, and said housing including a through hole adapted to receive the second holding means of the ferrule means, and
anchoring means provided at the base end of the plug for anchoring the plug within the housing, said anchoring means disposed along a portion of the fixing sleeve means which is not covered and held by said second holding means of the ferrule means.

17. The connector plug of claim 16 wherein said anchoring means includes an elastic body and a spring member having a configuration adapted to be received within a mounting hole in said housing.

18. An optical connector comprising at least two plugs, each accommodated in a separate housing, and adapter means connecting the plugs and their respective housings to each other in tight fit, each said plug having a base end and a forward end and having fitted therein an optical fiber cable comprised of at least one optical fiber at least an outside jacket covering the optical fiber and each said plug comprising
fixing sleeve means for fixing the optical fiber cable at its jacket on the base end of the plug, said optical fiber without its jacket extending from said fixing sleeve means toward end of the plug,
ferrule means secured around said fixing sleeve means and extending beyond said fixing sleeve means to the forward end of said plug, said ferrule including a first holding means in contact with said optical fiber for guiding toward the forward end of the plug that part of the optical fiber cable which projects from the fixing sleeve means without its jacket and holding it in place, and a second holding means for covering sand holding at least that part of the fixing sleeve means is fixed to the second holding, said housing accommodating said plug including a through hole adapted to receive the second holding means of the ferrule means,
anchoring means provided at the base end of the plug for anchoring the plug within its housing, and
said adapter means having an axial bore adapted to receive at either end the first holding means of the ferrule means of each of said plugs, the adapter means also having an outer surface which is identically shaped at both ends so as to be received within the housing of each plug.

19. The optical connector of claim 18 wherein said anchoring means includes an elastic body, a washer and a spring member, said spring member adapted to be received within the housing and to hold washer in place to arrest movement of the plug, said elastic body absorbing displacement of each said plug when connected to the other plug through said adapter means, thereby providing the accurate alignment of the ends of the opposing optical fibers.

* * * * *